No. 736,570. Patented August 18, 1903.

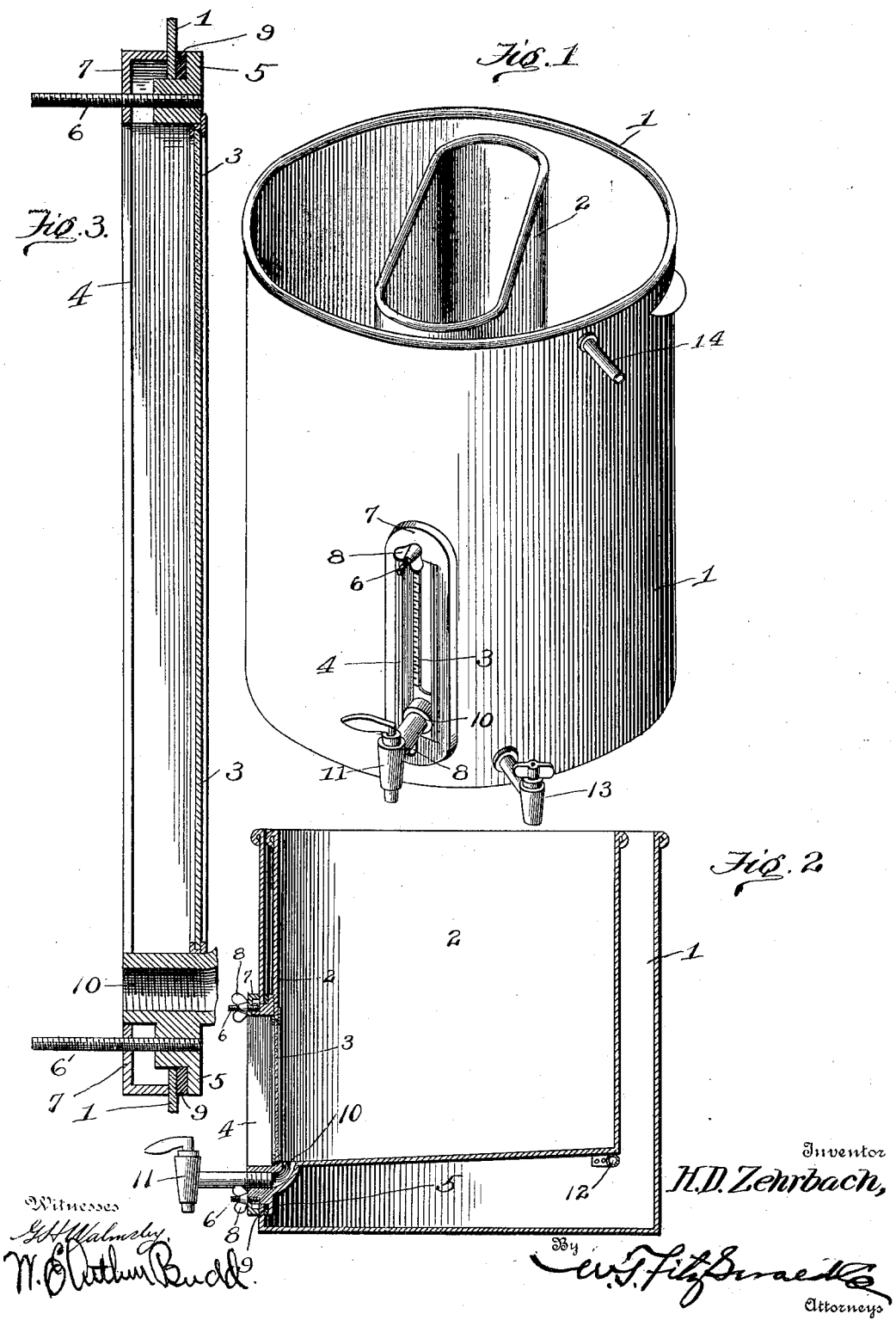

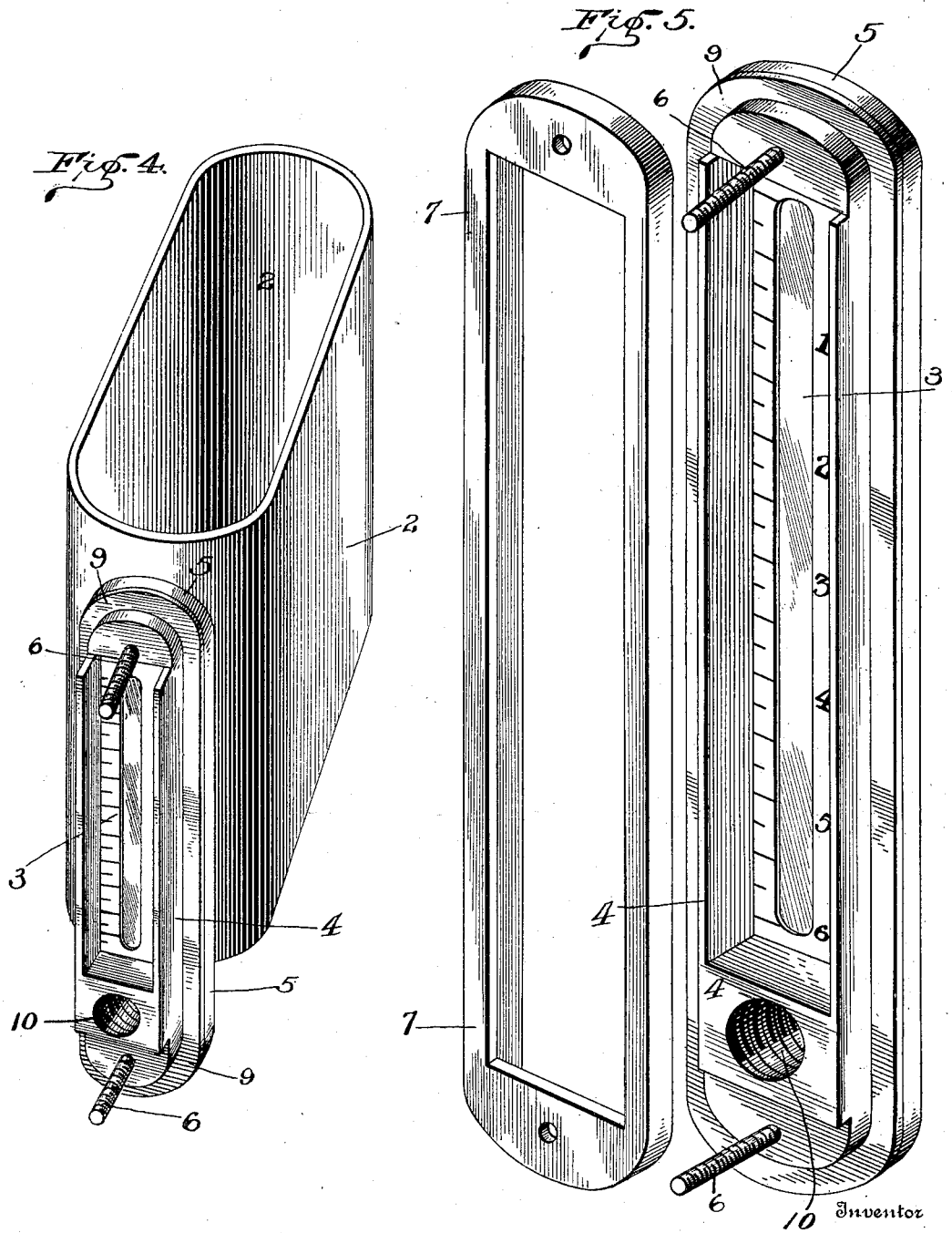

UNITED STATES PATENT OFFICE.

HENRY D. ZEHRBACH, OF BLUFFTON, OHIO, ASSIGNOR OF ONE-HALF TO A. D. LUGIBIHL, OF BLUFFTON, OHIO.

CREAM-SEPARATOR.

SPECIFICATION forming part of Letters Patent No. 736,570, dated August 18, 1903.

Application filed April 21, 1902. Serial No. 104,043. (No model.)

*To all whom it may concern:*

Be it known that I, HENRY D. ZEHRBACH, a citizen of the United States, residing at Bluffton, in the county of Allen and State of Ohio, have invented certain new and useful Improvements in Cream-Separators; and I do hereby declare the following to be a full, clear, and exact description of the invention, such as will enable others skilled in the art to which it appertains to make and use the same.

My invention relates to certain new and useful improvements in cream-separators of that class wherein the cooling process is employed to speedily separate the cream from the milk.

My object is to provide a cheap durable device that may be easily taken apart and cleansed and that will effectually accomplish the result in a minimum space of time.

Other objects and advantages will be made fully apparent from the following specification, considered in connection with the accompanying drawings, in which—

Figure 1 is a perspective view of my invention complete. Fig. 2 is a central vertical sectional view thereof. Fig. 3 is a sectional view of the gage and device employed in securing the parts together. Fig. 4 is a perspective view of the inner receptacle and parts carried thereby removed from the outer receptacle. Fig. 5 is a perspective view of the combined gage and securing device.

In the drawings, 1 indicates the outer receptacle, which is shown as cylindrical in form; but I do not desire to be confined to this particular construction, as it may be varied, if necessary. The receptacle 1 is adapted to receive an oblong receptacle 2, the said receptacle 2 having a gage 3, soldered or otherwise attached to one end thereof. This gage has two functions—it affords a view of the contents of the receptacle 2 and provides means for removably securing the receptacle 2 within the receptacle 1.

In order to permit the contents of the receptacle 2 to be seen, I place a glass or other transparent article in the frame 4 of the gage proper, it being understood that said glass is to be hermetically sealed within said frame, so that there will be no possibility of leakage. The frame 4 of the gage is provided with outwardly-extending flanges 5, said flanges being adapted to take against and form a bearing for the wall of the receptacle 1. The receptacle 1 is provided with an elongated orifice of sufficient size to snugly permit the body portion 4 of the said gage to pass therethrough. At the upper and lower extremity of the gage 3 are the bolts or studs 6, said bolts or studs being threaded throughout their length, and after being screwed through the gage 3 they are soldered or otherwise rigidly secured thereto, so that it will be impossible for them to turn.

In order to firmly hold the receptacle 2 within the receptacle 1, I provide a face-plate 7, cut away in the body portion thereof, thus forming an elongated orifice of sufficient size to snugly fit over the body portion 4 of the gage 3. I also provide orifices in the upper and lower ends of the said plate, through which are passed the outer or free ends of the bolts or studs 6. After the plate 7 has been placed upon the bolts or studs 6 thumb-nuts 8 are turned thereon, thereby driving the plate 7 toward the gage 3 and clamping the walls of the receptacle 1 firmly between said plate and the flanges 5.

In order to prevent any leakage through the orifice cut in the wall of the receptacle 1, I place the gasket 9 between the walls of the receptacle 1 and the flange 5. By this means it will be understood that the receptacle 2 may be easily and quickly removed from the receptacle 1 and said receptacles thoroughly cleaned, whereas by having the receptacles permanently secured together this result could not be accomplished.

In the lower portion of the gage 3 I have provided the threaded orifice 10, into which I secure the faucet or stop-cock 11. It is a material advantage for the said faucet or stop-cock to be removably secured to said receptacle from the fact that milk soon becomes tainted and if the faucet is not cleansed daily it becomes coated with the milk in a very short time and spoils the contents of the receptacle 2 when it is withdrawn from the receptacle through the said faucet or stop-cock. The orifice 10 is elongated, as clearly shown in Fig. 2, the walls of said orifice being soldered to the bottom portion of the receptacle 2, thereby forming a continuous channel from the receptacle to the stop-cock. The opposite end of the elongated receptacle 2 rests upon the supporting-bar 12, said bar being attached to the inner wall of the receptacle 1. In order to draw off the contents of the receptacle 1, I have provided a faucet or stopcock 13 at the lower edge thereof.

By continuously injecting water into the receptacle 1 through the pipe 14 or otherwise and opening the stop-cock 13 a continuous flow of water through the receptacle 1 is the result, thereby keeping the water fresh and increasing its cooling capacity.

In operation the receptacle 2 is filled with milk when water or other cooling substance is placed in the receptacle 1, thereby surrounding the receptacle 2 with said cooling substance, and by having the receptacle 2 elongated it presents a greater amount of surface to the cooling material, thereby allowing the milk to become thoroughly chilled within a very short time. This result is very desirable from the fact that if the milk is not chilled quickly a thorough separation of the cream and milk is not accomplished.

While I have described the preferred combination and construction of details deemed necessary in materializing my invention, I wish to comprehend in this application all possible substitutes and equivalents that may be considered as fairly falling within the scope of my invention.

Having thus fully described my invention, what I claim as new, and desire to secure by Letters Patent, is—

In a milk-cooler and cream-separator, the combination of an inner and outer receptacle of a gage-body carried by and secured to the inner receptacle, said gage having a gasket-seat on its outer edge whereby a portion of the gage may be extended through the opening in the wall of the outer receptacle; a gasket fitting said seat on the gage-body and resting against the edge of said opening; a face-plate adapted to fit around the edges of the outer side of said opening; means to clamp the gage-body and face-plate securely together, and a faucet-seat formed wholly in the gage-body proper and entirely independent of the face-plate, whereby the faucet may be removed from and restored to its operative position without disturbing the relative position of said gage, gasket and face-plate, substantially as set forth.

In testimony whereof I affix my signature in presence of two witnesses.

HENRY D. ZEHRBACH.

Witnesses:
HARLEY R. LUGIBIHL,
FRANK A. EATON.